United States Patent
Goodro et al.

(10) Patent No.: US 6,761,335 B2
(45) Date of Patent: Jul. 13, 2004

(54) APPARATUS FOR LOAD TRANSFER BETWEEN AEROSPACE VEHICLE COMPONENTS, AEROSPACE VEHICLES INCLUDING SAME, AND METHOD OF ATTACHMENT OF AEROSPACE VEHICLE COMPONENTS

(75) Inventors: Jerry B. Goodro, Murray, UT (US); Thomas W. Higgs, Kaysville, UT (US)

(73) Assignee: Alliant Techsystems Inc., Edina, MN (US)

( * ) Notice: Subject to any disclaimer, the term of this patent is extended or adjusted under 35 U.S.C. 154(b) by 127 days.

(21) Appl. No.: 09/997,642

(22) Filed: Nov. 29, 2001

(65) Prior Publication Data

US 2003/0098396 A1 May 29, 2003

(51) Int. Cl.⁷ .................................................. B64G 1/22
(52) U.S. Cl. ........................................ 244/172; 244/54
(58) Field of Search ........................... 244/54, 172, 55, 244/2, 158 R; 248/554, 555; 102/377, 378, 347, 352, 374, 381

(56) References Cited

U.S. PATENT DOCUMENTS

| | | | |
|---|---|---|---|
| 2,787,218 A | * | 4/1957 | Anthony ....................... 244/54 |
| 3,168,270 A | * | 2/1965 | Bligard et al. ................. 244/54 |
| 3,327,971 A | * | 6/1967 | Stewart et al. ................. 244/54 |
| 3,979,087 A | * | 9/1976 | Boris et al. .................... 244/54 |
| RE30,489 E | | 1/1981 | Abbott |
| 4,324,374 A | * | 4/1982 | Wittmann et al. ...... 244/158 R |
| 4,451,017 A | * | 5/1984 | Marshall ..................... 244/172 |
| 4,452,412 A | * | 6/1984 | Von Pragenau ............. 244/172 |
| 5,131,610 A | | 7/1992 | Demange |
| 5,226,616 A | | 7/1993 | Butkiewicz |
| 5,238,209 A | | 8/1993 | Hornyak |
| 5,257,761 A | * | 11/1993 | Ratz et al. .................. 244/172 |
| 5,370,343 A | | 12/1994 | Hornyak |

FOREIGN PATENT DOCUMENTS

| | | |
|---|---|---|
| JP | 03-134263 | 6/1991 |
| JP | 09-160175 | 6/1997 |

* cited by examiner

*Primary Examiner*—Galen L. Barefoot
(74) *Attorney, Agent, or Firm*—TraskBritt

(57) ABSTRACT

A coupling apparatus and method of attaching a booster rocket motor to a core rocket vehicle and transferring thrust load therebetween. The coupling apparatus includes a load transfer structure configured for substantial point load attachment to the core rocket vehicle and at least one load acceptance structure for load-distributing attachment to the booster rocket motor. A variable cross section structural member couples the at least one load acceptance structure and the load transfer structure and may include a varied transverse cross section I-beam. The cross section of the I-beam may be varied according to height, width or thickness of one or more of its members as it extends between the load acceptance and load transfer structures. One or more of such apparatus may be used to couple a single booster rocket motor to a core rocket vehicle.

43 Claims, 14 Drawing Sheets

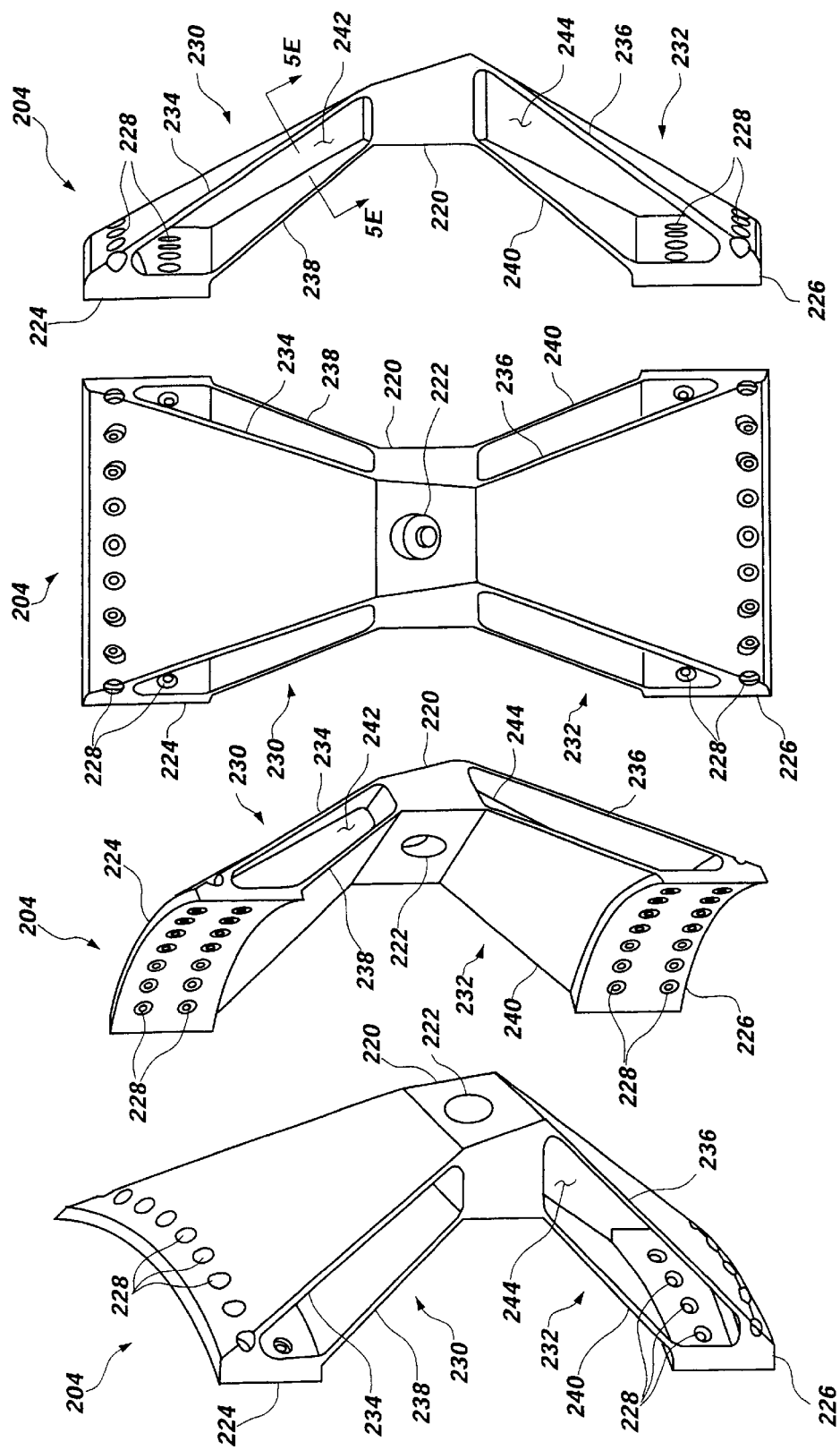

APPARATUS FOR LOAD TRANSFER BETWEEN AEROSPACE VEHICLE COMPONENTS, AEROSPACE VEHICLES INCLUDING SAME, AND METHOD OF ATTACHMENT OF AEROSPACE VEHICLE COMPONENTS

BACKGROUND OF THE INVENTION

1. Field of the Invention

The present invention relates generally to the mutual attachment of aerospace vehicle components such as the attachment of one or more booster rocket motors together or to a core rocket vehicle and, more particularly, to the transfer of a thrust load between such vehicle components while permitting varied stand-off distances therebetween.

2. State of the Art

Aerospace vehicle components, such as rocket motors, are used to transport various payloads into space. Such rocket motors typically burn chemical propellants, either solid or liquid, to provide the thrust required during the vehicle's ascent through the earth's atmosphere and into orbit. This thrust is achieved by combustion of the propellants, resulting in the ejection of hot gases through a nozzle to the rear of the vehicle. A large amount of thrust is required to launch an aerospace vehicle, the exact amount of thrust varying from one aerospace vehicle to another depending on a number of factors including the payload of the vehicle. The variation of payload in an aerospace vehicle may require considerable reconfiguration of the thrust design including larger or additional booster rocket motors being attached to the core vehicle. The reconfiguration of thrust-providing components often poses design difficulties, particularly with respect to their relation to each other and to launch pad structures.

For example, referring to FIG. 1A, the aft end of a prior art core rocket vehicle 100 is shown positioned in a launch pad structure 102. If booster rocket motors are attached to the core rocket vehicle 100, either the launch pad structure 102 would require reconfiguration to accommodate the booster rocket motors or the booster rocket motors would have to be attached to locate them outwardly of the launch pad structure 102 to avoid physical interference with the launch pad structure 102. As launch pad structures are extremely expensive to design and manufacture, it is often the case that the addition of booster rocket motors (or a change in the size of existing booster rocket motors) involves significant design considerations regarding the manner of their attachment to the core rocket vehicle 100. Such design considerations include not only structural issues of transferring thrust from the booster rocket motor to the core rocket vehicle 100, but the positional or spatial considerations regarding the arrangement of the booster rocket motors relative to the core rocket vehicle 100, an existing launch pad structure 102, or other structures.

Referring to FIG. 1B, a bottom plan view is shown of the launch pad structure 102 with a the core rocket vehicle 100 positioned thereon. With a structure of this configuration, the booster rocket motor location which would allow the closest lateral attachment of a booster rocket motor to the core rocket vehicle 100 (the lateral distance being referred to as the stand-off distance) may be along the centerline 104 which extends radially from the center of the core rocket vehicle 100 and is oriented perpendicularly to the closest side 106 of the launch pad structure 102. However, it may not always be desirable to mount the booster rockets in this location.

For example, if it was desired to utilize four booster rocket motors, the configuration resulting in the shortest stand-off distance might be that shown in FIG. 2. In this case, booster rocket motors 108 have been shifted to one side or another of the centerline 104. By moving the rocket motors laterally from the centerline 104, the stand-off distance is increased.

However, it should be noted that designing the shortest stand-off distance between a booster rocket motor 108 and the core rocket vehicle 100 entails more than just determining the circumferential position of the booster rocket motor 108 relative to both the core rocket vehicle 100 and the launch pad structure 102. Other considerations must be taken into account as well. For example, with reference to FIG. 3, even though the booster rocket motors 108 have been located such that there is no physical interference with the launch pad structure 102, the exit cones 110 of the booster rocket motors are located such that the launch pad structure 102 may be in the path of hot gases exhausted from the exit cones 110. This exposure may lead to costly damage to the launch pad structure 102 or vehicle failure through interference with core rocket vehicle components. Thus, proper arrangement of the booster rocket motors 108 would include an increased stand-off distance to avoid any damage to the launch pad structure 102.

Increases in stand-off distance induces greater stress within the coupling apparatuses utilized to transfer the thrust from the booster rocket motors 108 to the core rocket vehicle 100. With new designs and technology, thrust levels produced by such booster rocket motors are continually being increased. Current levels of thrust produced by booster rocket motors are often several hundred thousand pounds, while contemplated designs reach upwards of 1,000,000 lbs. of thrust. The combination of larger booster rocket motors having increased thrust with the need to provide increased and varied stand-off distances requires improved coupling apparatuses for coupling the booster rocket motors with the core rocket vehicles and transferring the thrust loads therebetween. Additionally, various alignment requirements for booster rocket motors may require an attachment structure which allows greater flexibility regarding where the attachment structure may be located on the core rocket vehicle or the booster rocket motors.

One type of coupling apparatus commonly used to attach booster rocket motors to core rocket vehicles includes a pair of rods or struts, one end of each rod being attached to the core rocket vehicle and the other end of each rod being attached to the booster rocket motor. While such an arrangement may be sufficient for certain combinations of thrust loads and stand-off distances, this type of coupling apparatus suffers from various drawbacks which are only exacerbated as thrust loads and stand-off distances are increased. For example, rods or struts have typically only been effective in coupling booster rocket motors having small stand-off distances (e.g., 2 to 8 inches). However, as the stand-off distance increases, the stress induced within the rod similarly increases. Likewise, the induced stress increases when the thrust of a booster rocket motor increases. Additionally, such coupling apparatuses are designed to transfer thrust substantially through point loading. These point loads are concentrated at individual attachment locations on the booster rocket motor casing and on the core rocket vehicle. Often, such point loading is undesirable, particularly when exerted on composite structures such as are typically used for the booster rocket motor casings.

In view of the shortcomings in the state of the art, it would be advantageous to provide a coupling apparatus for and method of attaching booster rocket motors to each other or to core rocket vehicles and transferring thrust loads therebetween. The structure and method would desirably allow for high stand-off distances to be utilized while efficiently transferring high thrust loads from the booster rocket motor to the core rocket vehicle. Additionally, it would be desirable to provide such a structure having a relatively high strength-to-weight ratio so as to avoid adding unnecessary weight to the overall structure. It would further be desirable to provide a structure and method of attachment which helps reduce the loading and associated stress placed on the casing of the booster rocket motor.

BRIEF SUMMARY OF THE INVENTION

In accordance with one aspect of the invention, an apparatus is provided for coupling a booster rocket motor to a core rocket vehicle and transferring loads therebetween. The apparatus includes at least one load acceptance structure which is configured for load-distributing attachment with the booster rocket motor. At least one load transfer structure is configured for substantial point load attachment with the core rocket vehicle. A structural member is coupled between the structures, the structural member including at least a portion configured as an I-beam. The I-beam may further be configured to exhibit a varied cross section as it extends between the load transfer and load acceptance structures. For example, the flanges of the I-beam may vary in width and/or thickness or exhibit curved sections. Similarly, the web may vary in height and/or thickness. The apparatus may be formed of aluminum, such as 7075 aluminum, or some other suitable material desirably having a modulus of elasticity which is similar to that of the booster rocket motor casing.

According to another aspect of the invention, another apparatus is provided for coupling a booster rocket motor to a core rocket vehicle. The apparatus includes at least one load transfer structure configured for substantial point load attachment with the core rocket vehicle. At least one load acceptance structure is configured for load-distributing attachment with the booster rocket motor. A structural member is coupled between the load transfer and load acceptance structures and exhibits a varied transverse cross section as it extends between the load transfer and acceptance structures. The structural member may include an I-beam configuration or some other structural shape.

According to another aspect of the invention, a method is provided for coupling a booster rocket motor to a core rocket vehicle for the transfer of thrust therebetween. The method includes providing a booster rocket motor having a portion of its case being configured for substantial load-distributing attachment. One or more saddles are formed on a portion of the booster rocket motor, the saddle(s) being configured for load-distributing attachment. An apparatus for coupling the booster rocket and core rocket vehicle is also provided. The coupling apparatus includes a load acceptance structure configured for load-distributing attachment, and a load transfer structure configured for substantial point load attachment, and a structural member having a variable cross section is provided and coupled between the load acceptance and load transfer structures. The load acceptance structure is coupled to the attachment portion of the booster rocket motor and the load transfer structure is coupled with the attachment portion of the core rocket vehicle. The method may also include configuring the structural member of the coupling apparatus as an I-beam exhibiting a varied cross section along its length.

In accordance with yet another aspect of the invention, a method is provided for forming one or more saddles in a composite casing of a booster rocket motor for attachment of a coupling apparatus and, more particularly, to the aforementioned load acceptance structure of a coupling apparatus. The method includes placing a rubber shear ply adjacent an exterior surface of the composite casing. The shear ply may be formed of natural or synthetic rubber such as nitrile-butadiene rubber (NBR) or ethylene-propylene-diene monomer (EPDM). An attachment structure configured for attachment to the coupling apparatus is formed atop the rubber shear ply and a fiber hoop overwrap, such as graphite or fiberglass, is formed over portions of the attachment structure.

BRIEF DESCRIPTION OF THE SEVERAL VIEWS OF THE DRAWINGS

The foregoing and other advantages of the invention will become apparent upon reading the following detailed description and upon reference to the drawings in which:

FIGS. 5A–5E show various views of the coupling apparatus used in FIG. 4 with FIG. 5E showing the cross section as indicated in FIG. 5D;

DETAILED DESCRIPTION OF THE INVENTION

Figure 1A:
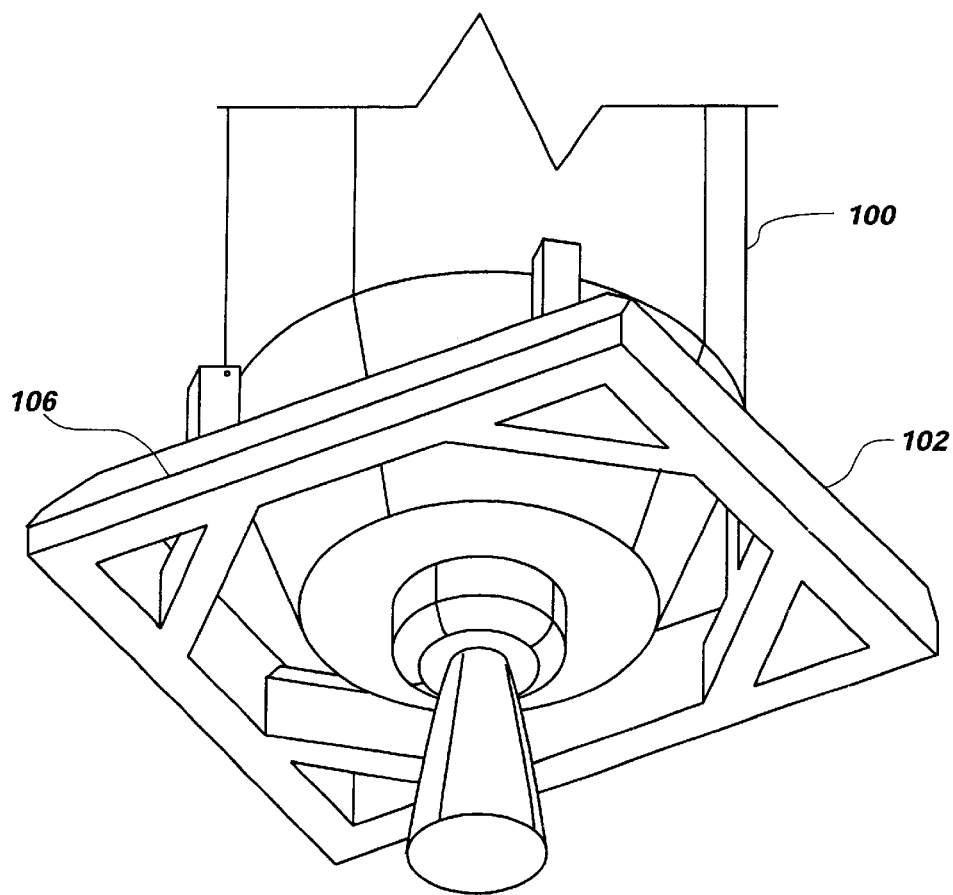
FIGS. 1A and 1B show a perspective view and an elevational view respectively of the aft end of a core rocket vehicle positioned in a launch pad structure.
Figure 1B:
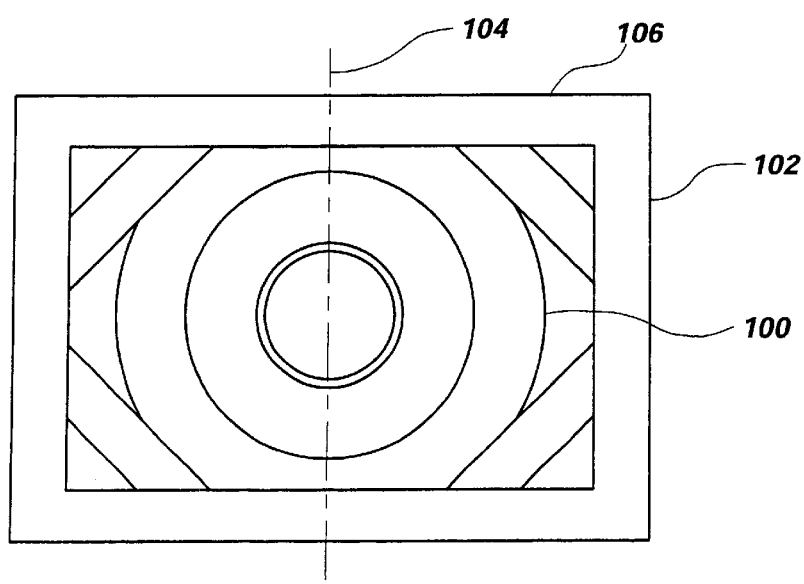
Figure 2:
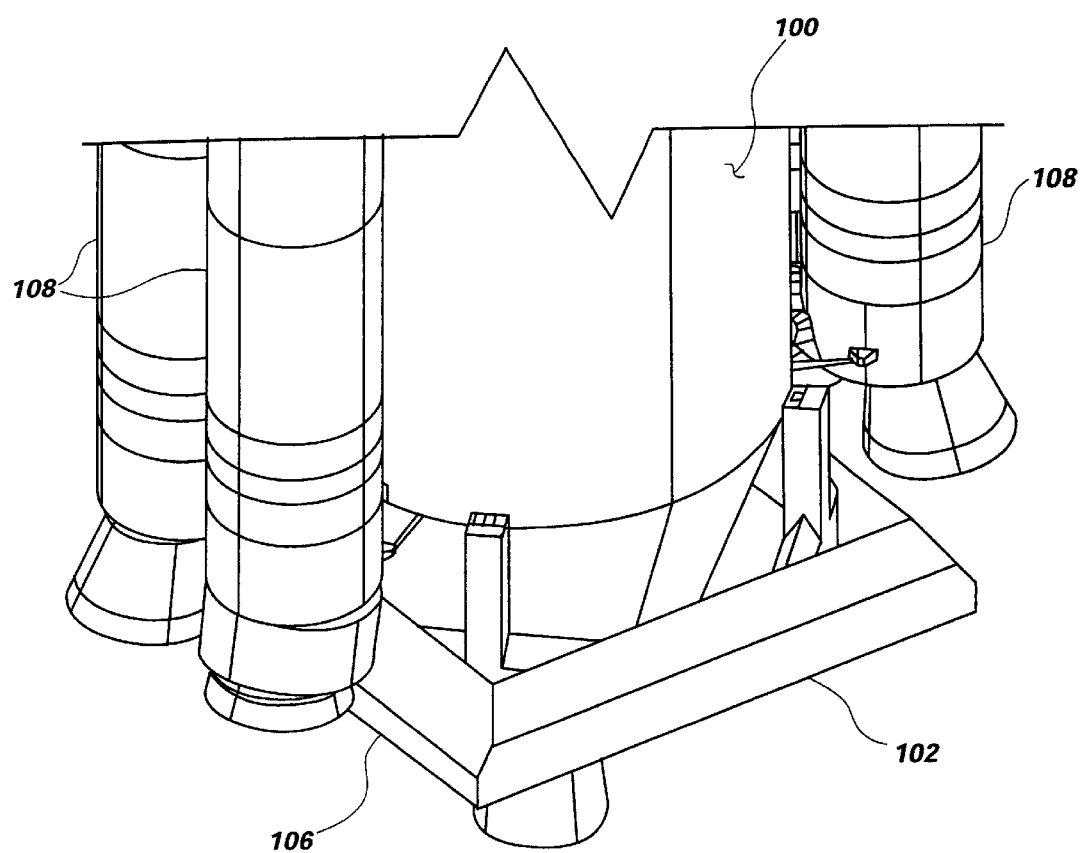
FIG. 2 is a perspective view of the aft end of a core rocket vehicle having multiple booster rocket motors attached with a prior art structure.
Figure 3:
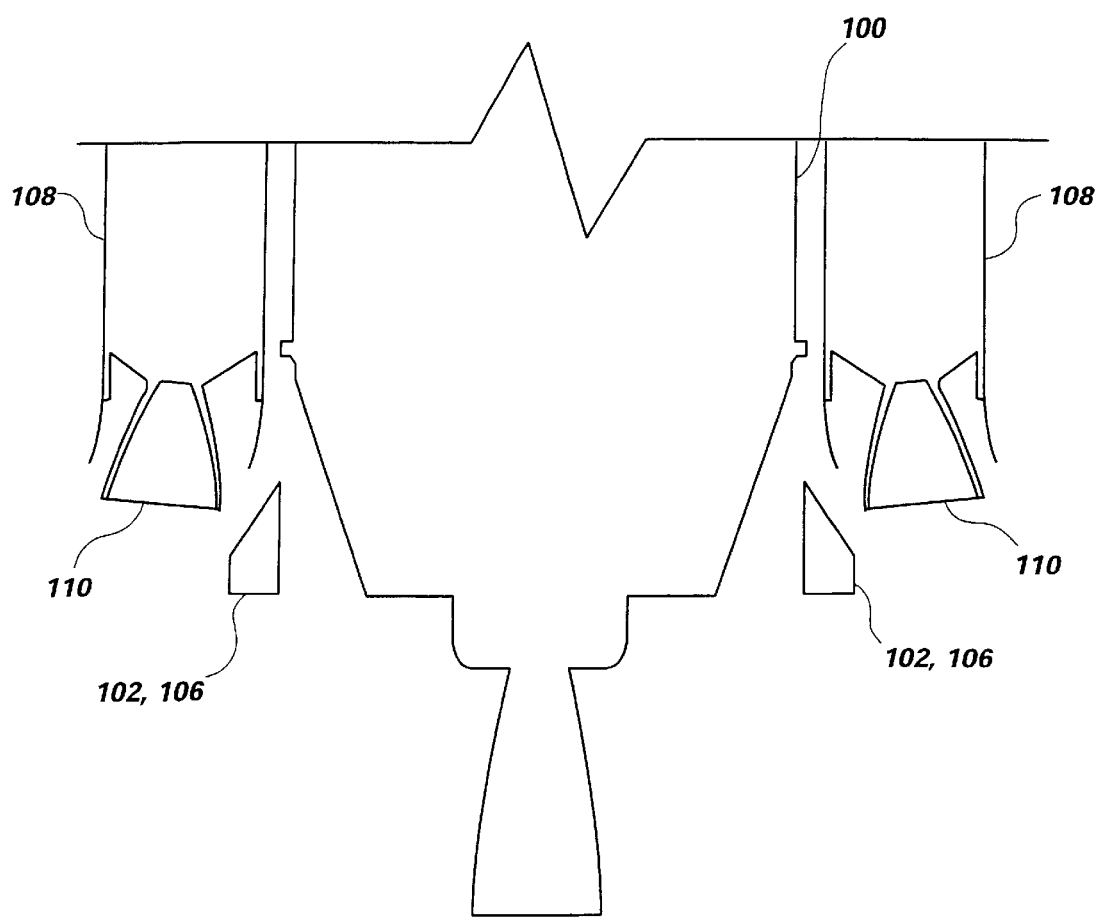
FIG. 3 is a schematic view of a core rocket vehicle and booster rocket motors attached with a prior art structure.
Figure 4:
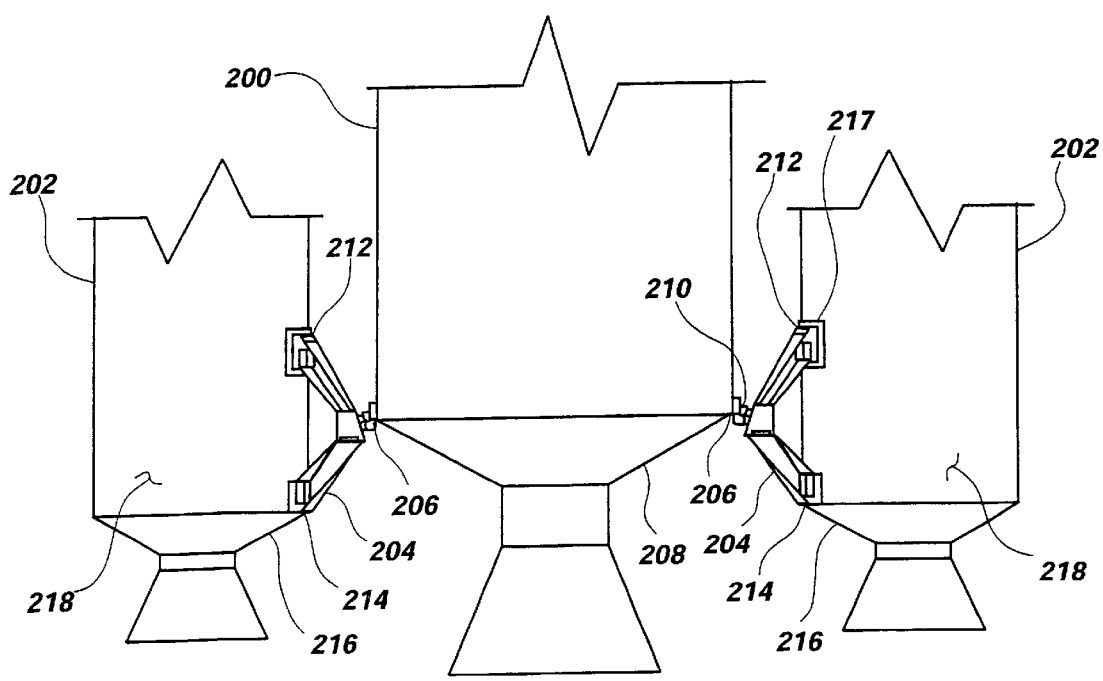
FIG. 4 is a partial elevational view of a core rocket vehicle and associated booster rocket motors attached according to one aspect of the present invention.

Referring to FIG. 4, a core rocket vehicle 200 has a booster rocket motor 202 attached to it by way of a coupling apparatus 204 according to one embodiment of the present invention. The coupling apparatus 204 also serves to transfer thrust loads provided by the booster rocket motor 202 to the core rocket vehicle 200. The coupling apparatus 204 is coupled to an attachment block 206 at a single location on the aft end 208 of the core rocket vehicle 200 in a manner which results in substantial point loading at the attachment block 206. Such attachment may be accomplished by means known to those of ordinary skill in the art such as a ball joint, a half-ball joint, a pin and clevis arrangement or the like. The attachment depicted in FIG. 4 includes a ball joint 210 for coupling the coupling apparatus 204 to the core rocket vehicle 200. The coupling apparatus 204 is attached to the booster rocket motor 202 at a forward location 212 thereon and an aft location 214 proximate the aft end 216 of the booster rocket motor 202. As seen at the forward location 212, attachment of the coupling apparatus 204 to the booster rocket motor 202 may include a saddle 217 formed on the booster rocket motor casing or membrane 218 as shall be discussed in more detail below. Attachment of the coupling apparatus 204 to the booster rocket motor 202 is designed to distribute the thrust load produced by the latter through a substantial region of the booster rocket motor casing 218. Such a design allows for the reduction of localized stress generated within the casing 218 and increases the ability to transfer larger thrust loads from the booster rocket motor 202 to the core rocket vehicle 200.

Referring to FIGS. 5A through 5D, the coupling apparatus 204 is shown and described in greater detail. A load transfer structure in the form of a shear block 220 is centrally located and includes a bore 222 for receipt of an attachment mechanism such as, for example, the ball joint 210 of FIG. 4. Forward and aft load acceptance members 224 and 226, respectively, are configured to be complementarily mounted on the surface of the booster rocket motor casing 218 or a similar mounting surface such as an integrated saddle 217 (FIG. 4). Each of the load acceptance members 224 and 226 includes a plurality of apertures 228 arranged in two rows, although, other geometric configurations are possible. The apertures 228 serve as fastener holes to facilitate attachment of the coupling apparatus 204 to the booster rocket motor 202. The apertures 228 may include counterbores for receipt and at least partial concealment of the heads of fasteners placed therethrough.

It is noted that the coupling apparatus 204 distributes the thrust load of the booster rocket motor 202 through its casing 218 through multiple paths. First, the thrust load is distributed by having two separate attachment points on the booster rocket motor casing 218, namely at the forward and aft locations 212 and 214. The thrust load is further distributed at these individual locations 212 and 214 by spreading the surface of attachment about the circumference of the booster rocket motor casing 218 via the load acceptance members 224 and 226. Additionally, the use of multiple, vertically offset rows of apertures 228 allows for further load distribution.

Structural members 230 and 232 extend respectively between the load acceptance members 224, 226 and the shear block 220. The structural members 230 and 232 are shown to be configured as variable transverse cross section I-beams. While the invention is shown and described in terms of including a variable transverse cross section I-beam, it will be understood and appreciated by those of ordinary skill in the art that other structural shapes might be used for the structural members 230 and 232. For example, a structural shape such as a structural angle or channel having varied transverse cross sections along their respective lengths might be used as a structural member 230 or 232. Alternatively, a box-type beam might be incorporated instead of an I-beam. However, a variable cross section I-beam provides desirable load and stress distribution characteristics and thus is used as a specific example herein.

Each structural member 230 and 232 respectively includes a first flange member 234 and 236, a second flange member 238 and 240, and an interposed web member 242 and 244 to form the I-beam configuration. The first flange members 234 and 236 and the second flange members 238 and 240 are generally configured to increase in width as they extend from proximate the shear block 220 (or from adjacent the point of attachment to the core rocket vehicle 200) to proximate the load acceptance members 224 and 226 (or to the locations of attachment to the booster rocket motor 202). Additionally, while the flange members 234, 236, 238 and 240 are shown to exhibit a substantially constant thickness as they extend from the shear block 220 to the load acceptance members 224 and 226, they may vary in thickness according to specific design criteria including stress concentrations and strength-to-weight considerations. As shown in FIGS. 5A through 5D, the flange members 234, 236, 238 and 240 may also provide a smooth and gradual transition between the generally curved load acceptance members 224 and 226 and the generally rectilinear shear block 220.

Figure 5E:
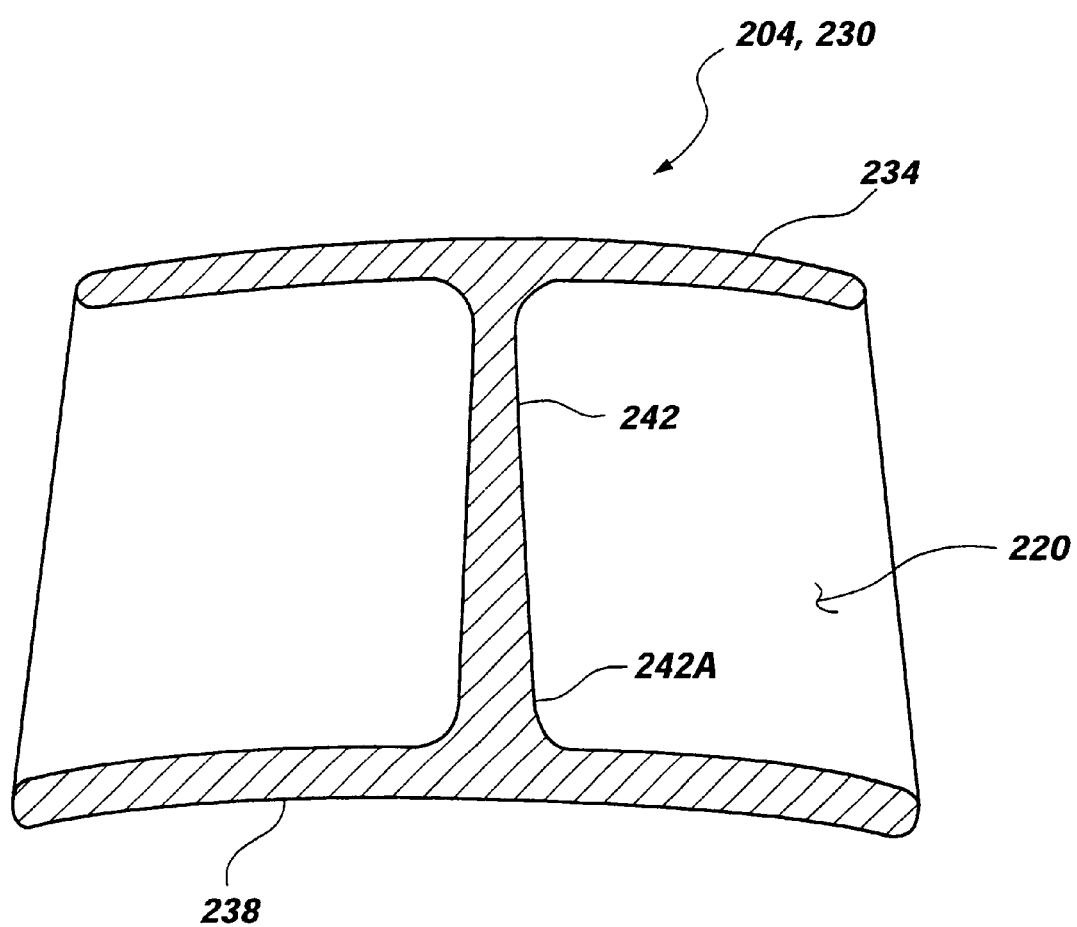

The web members 242 and 244 are formed to be generally perpendicular to the flange members 234, 238 and 236, 240 respectively. Additionally, the web members may be tapered as shown in FIG. 5E having an increased thickness at its base 242A. The taper of the web members 242, 244 may result in a more efficient load transfer, but may also be a consideration in efficiently fabricating the coupling apparatus 204. The web members 242 and 244 may also vary in height, such as by increasing their height as they extend from the shear block 220 toward the load acceptance members 224 and 226 respectively. This can best be seen in FIG. 5B with respect to web member 242. However, a web member having a substantially constant height or other varied cross-sectional configurations may be utilized.

The coupling apparatus 204 efficiently transfers the thrust load generated by a booster rocket motor 202 to the core rocket vehicle 200 while allowing relatively high stand-off distances between the core rocket vehicle 200 and the booster rocket motor 202 to be maintained. For example, the coupling apparatus 204 allows for stand-off distances of approximately 8 inches to three feet (36 inches), or greater, without failure in either the coupling apparatus 204, the core rocket vehicle 200 or the booster rocket motor 202. Additionally, the increased stand-off distance may be obtained without significant addition of weight to the assembly of the booster rocket motors 202 and core rocket vehicle 200, depending on the material used to fabricate the coupling apparatus 204.

Various methods may be used to fabricate the coupling apparatus 204. One method of making the coupling apparatus 204 is to produce a forging which represents the general shape of the coupling apparatus 204. The coupling apparatus 204 is then machined from the forging, including the removal of material to form the pockets between the flange members 234, 238 and 236, 240 on both sides of the web members 242 and 244 respectively. Additionally, the bore 222, the apertures 228, and any fillets or radii may be machined from the forging. It is noted that such radii and fillets may be strategically designed and located to reduce stress in the coupling apparatus 204.

It is further desirable to form the coupling apparatus 204 from a material which has a modulus of elasticity similar to that of the equivalent modulus of elasticity of the booster rocket motor casing 218 (the booster rocket motor casing: 218 typically being formed as a carbon fiber composite). One such material may include aluminum, such as 7075 type aluminum which exhibits a modulus of elasticity of approximately $10.4 \times 10^3$ ksi (kilo-pounds per square inch) (approximately $71.7 \times 10^3$ MPa (megapascals)). In matching materials, one may first form the booster rocket motor casing 218 and then select an appropriate material for the coupling apparatus 204 or, alternatively, one may form the coupling apparatus 204 and then select an appropriate material for the booster rocket motor casing 218.

Materials and methods of fabrication other than forging and including aluminum may alternatively be utilized in forming the coupling apparatus 204. For example, the structure may be cast from aluminum or alloys thereof, or from steel or alloys thereof Alternatively, the coupling apparatus 204 may be formed of individual components which are joined together such as by welding. For example, the shear block 220, the load acceptance members 224 and 226, and the structural members 230 and 232 may each be individual components which are welded together, if the individual components are formed of similar materials, to form the resulting coupling apparatus 204. Additionally, the structural members 230 and 232 may be formed of individual components such as individual flange members 234, 236, 238 and 240 and web members 242 and 244. Of course a combination of such processes may be used as will be recognized by one of ordinary skill in the art. For example, the structural members 230 and 232 may be integrally cast with their respective load acceptance members 224 and 226 and each structural member 230 and 232 subsequently joined to the shear block 220. While such methods of fabrication may result in a single unified structure, it is noted that, as used herein, the term "unitary" refers to a structure where all of the individual components are integrally formed (i.e., without a subsequent joining process such as welding).

Another method of fabricating the coupling apparatus 204 is to produce several sections as independent members and subsequently fasten the independent members together, such as, for example, with bolts, rivets or other suitable fasteners. As noted above, the fabrication of independent members may reduce some complexity associated with manufacturing and machining the coupling apparatus 204. Additionally, fabrication of individual members may allow for use of multiple materials, i.e., the structural members 230, 232 being formed of a different material than the load acceptance members 224, 226 or load transfer 220 structures, in order to provide, for example, an improved strength-to-weight ratio of the resulting coupling apparatus 204.

Figure 6A:
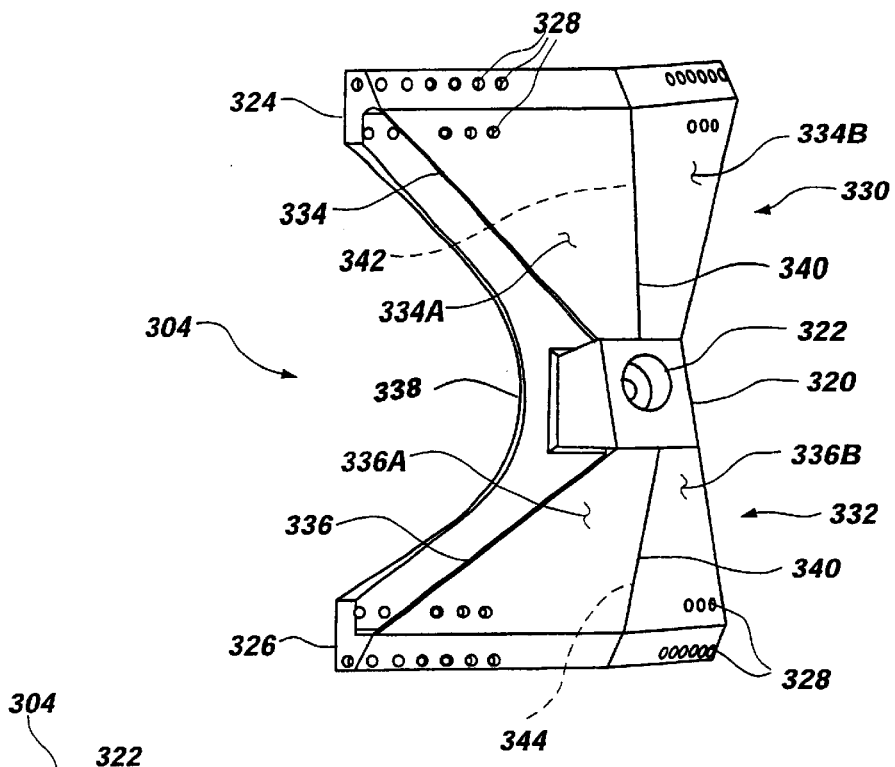
FIGS. 6A–6C show various views of a coupling apparatus according to another embodiment of the invention.
Figure 6B:
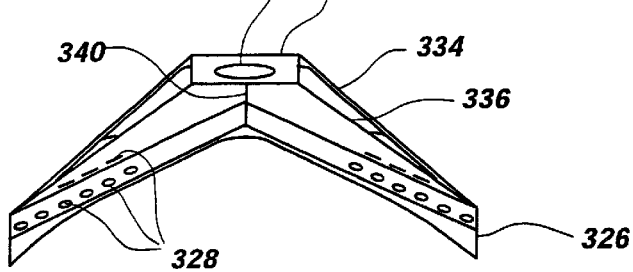
Figure 6C:
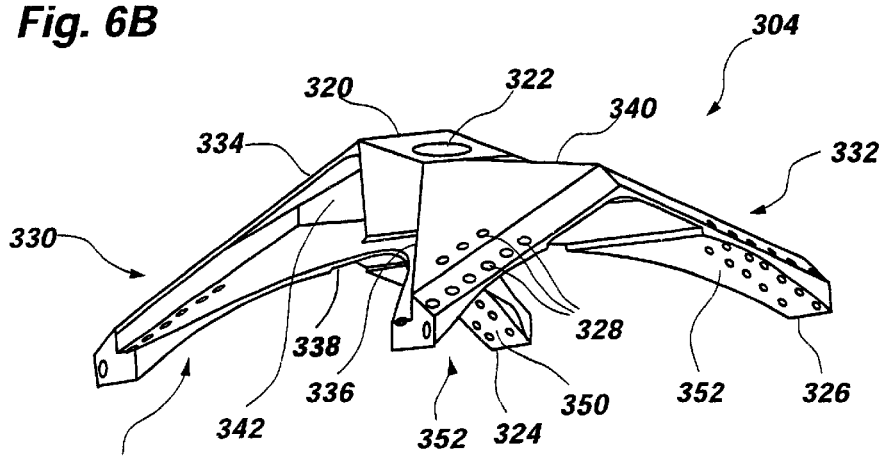

Referring to FIGS. 6A through 6C, an alternative embodiment of the coupling apparatus 304 is shown. A load transfer structure in the form of a shear block 320 is centrally located and includes a bore 322 for receipt of an attachment mechanism such as, for example, the ball joint 210 of FIG. 4. Forward and aft load acceptance members 324 and 326, respectively, are configured to be complementarily mounted on the surface of the booster rocket motor casing 218 or a similar mounting surface such as an integrated saddle 217 (FIG. 4). Each of the load acceptance members 324 and 326 includes a plurality of apertures 328 arranged in two rows, although other geometric configurations are possible. The apertures 328 serve as fastener holes to facilitate attachment of the coupling apparatus 304 to the booster rocket motor 202. The apertures 328 may include counterbores for receipt and at least partial concealment of the heads of fasteners placed therethrough.

Structural members 330 and 332 extend respectively between the load acceptance members 324, 326 and the shear block 320. The structural members 330 and 332 are shown to be configured as modified variable transverse cross section I-beams.

Structural members 330 and 332 each respectively include first flange members 334 and 336 coupled to a second common flange member 338 by interposed web members 342 and 344. The resulting structural members 330 and 332 may be described as a modified I-beam configuration. The first flange members 334 and 336 and the second flange member 338 may generally be configured to increase in width as they extend from proximate the shear block 320 (or from adjacent the point of attachment to the core rocket vehicle 200) to proximate the load acceptance members 324 and 326 (or to the locations of attachment to the booster rocket motor 202). Additionally, while the flange members 334, 336 and 338 are shown to exhibit a substantially constant thickness as they extend from the shear block 320 to the load acceptance members 324 and 326, they may vary in thickness according to specific design criteria including stress concentrations and strength-to-weight considerations.

The first flange members 334 and 336 are each shown to be formed of two sections 334A, 334B and 336A, 336B respectively. The sections 334A, 334B, 336A and 336B are configured such that the first flange members 334 and 336 are substantially angular members with a vertex line 340 being defined at the adjoining boundaries of each section (i.e., 334A with 334B, and 336A with 336B). Likewise, the second flange member 338 may be formed of sections having a corresponding vertex line. Alternatively, the second flange member 338 may be a generally curvilinear member.

The angles formed by each of the first flange members 334 and 336 are generally parallel with each other, allowing for ease of manufacturing, particularly with regard to forming the hollowed out sections between the first flange members 334 and 336 and the second flange member 338. For example, by defining parallel angles with the first flange members 334 and 336, and by having a common or generally continuous second flange member 338, the areas therebetween define a generally continual pathway from one load acceptance structure 324 to the other 326 for machining purposes. The simplification in manufacturing allows for cost and time savings in producing the coupling apparatus 304.

The upper ends of web members 342 and 344 are generally oriented along the vertex line 340 formed in each of the first flange members 334 and 336 and extend down to the second flange member 338. As with previously described embodiments, the web members 342 and 344 may be tapered so as to exhibit an increased thickness at their bases, i.e., where they attach with the second flange member 338. As discussed above, the taper of the web members 342 and 344 may result in a more efficient load transfer, but may also be a consideration in efficiently fabricating the coupling apparatus 304. The web members 342 and 344 may also vary in height as they extend from the shear block 320 toward the load acceptance members 324 and 326 respectively. Alternatively, the web members 342 and 344 may exhibit a substantially constant height or other varied cross-sectional configurations.

It is noted that, while structural members 330 and 332 are formed to define generally parallel angles, the load acceptance members 324 and 326 are configured to cooperatively mate with the geometric configuration of a booster rocket motor 202. For example, the load acceptance members 324 and 326 depicted include radiused surfaces 350 and 352 respectively for cooperative mating of the coupling apparatus 304 with a similarly radiused casing 218 of a booster rocket motor 202.

As with previously described embodiments, the coupling apparatus 304 efficiently transfers the thrust load generated by a booster rocket motor 202 to the core rocket vehicle 200 while allowing maintenance of relatively high stand-off distances, which may be varied according to specific designs, between the core rocket vehicle 200 and the booster rocket motor 202.

Figure 7:
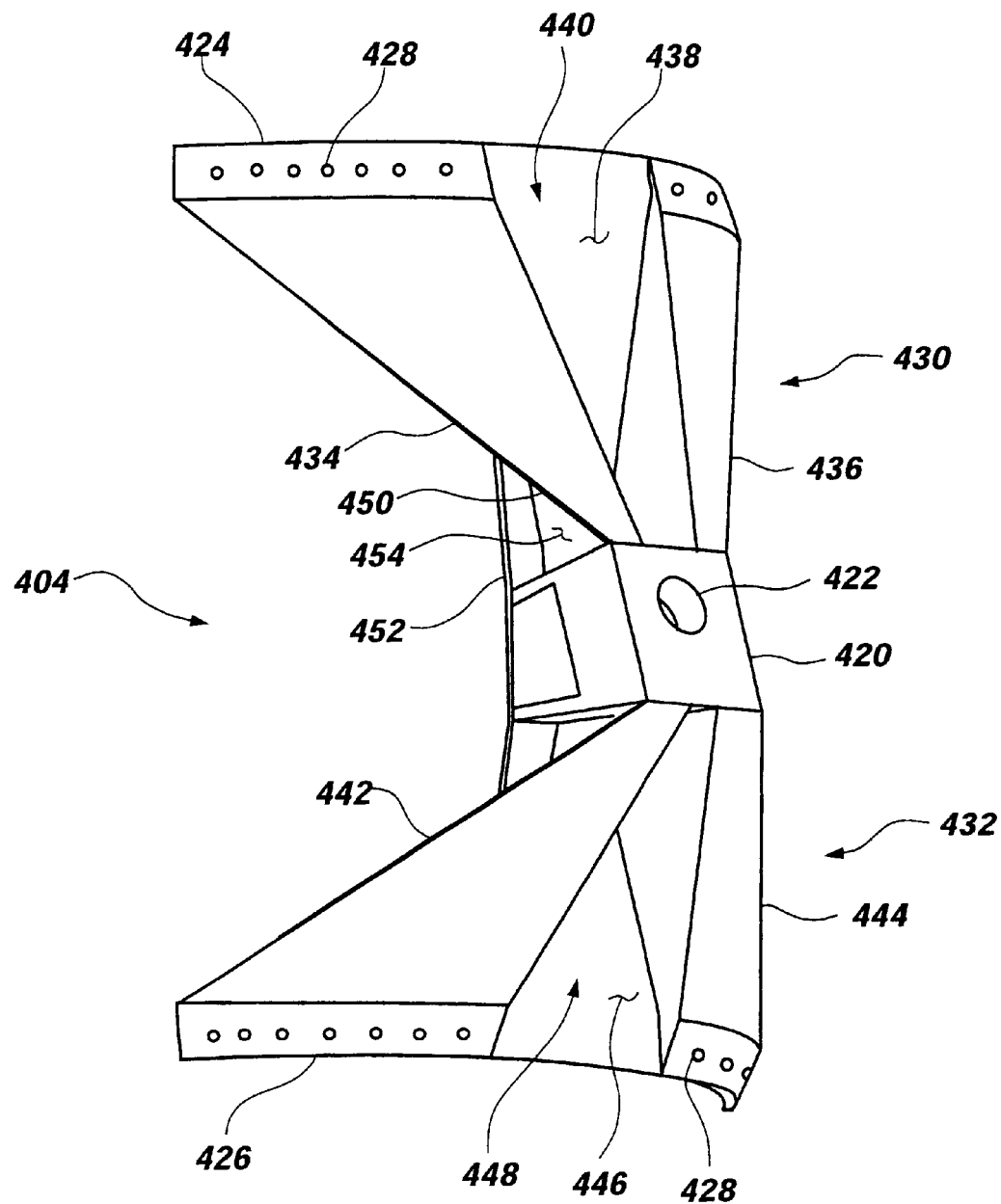
FIG. 7 shows a perspective view of a coupling apparatus according to yet another embodiment of the invention.

Referring to FIG. 7, a perspective view of a coupling apparatus 404 according to another embodiment is shown. The coupling apparatus 404 includes a load transfer structure in the form of a shear block 420 which is centrally located and includes a bore 422 for receipt of an attachment mechanism such as, for example, the ball joint 210 of FIG. 4. Forward and aft load acceptance members 424 and 426, respectively, are configured to be complementarily mounted on the surface of the booster rocket motor casing 218 or a similar mounting surface such as an integrated saddle 217 (FIG. 4). As with previously described embodiments, each of the load acceptance members 424 and 426 includes a plurality of apertures 428 which serve as fastener holes to facilitate attachment of the coupling apparatus 404 to the booster rocket motor 202.

Structural members 430 and 432 extend respectively between the load acceptance members 424, 426 and the shear block 420. Structural member 430 is configured to include two substantially C-shaped members 434 and 436, similar to structural channels, oriented in a back-to-back spaced relationship. A structural plate 438 or similar structural component is formed between and coupled to the C-shaped members 434 and 436 and serves to define a generally open space 440 therebetween. Similarly, structural member 432 includes two C-shaped members 442 and 444 oriented in a back-to-back spaced relationship with a structural plate 446 coupled therebetween to define an open space 448.

Using substantially C-shaped member 434 as an example, it is generally formed of upper and lower flange members 450 and 452 and a web member 454 coupled therebetween. The web member 454 is generally attached to the flange members 450 and 452 along a single edge of each, resulting in a member exhibiting a generally "C" shaped cross sectional area as taken transverse to the C-shaped member 434 as it extends between the shear block 420 and the load acceptance member 424. The other C-shaped members 436, 442 and 444 are similarly configured.

The upper flange members 450 may be generally configured to increase in width as they extend from proximate the shear block 420 to proximate the load acceptance members 424 and 426. Additionally, the C-shaped members 434, 436, 442 and 444 may exhibit varied cross sections, taken transversely to the direction of extension between the shear block 420 and load acceptance members 424 and 426, as they extend between the shear block 420 and load acceptance members 424 and 426. Also, the web members 454 may exhibit a decrease in height as they extend outwardly from the shear block 420. The web members 454 or flange members 450 and 452 may also vary in thickness as they extend from the shear block 420 to the load acceptance members 424 and 426 according to specific design criteria including stress concentrations and strength-to-weight considerations.

One advantage of the configuration of coupling apparatus 404 is its relative ease of manufacture, which is partially due to its open design including the open spaces 440 and 448. Additionally, the coupling apparatus 404 may be constructed of fewer materials, thus providing advantages of reduced weight and lower production costs. However, the coupling apparatus 404 is generally more applicable to facilitating attachment of structures wherein reduced loading or substantially single axis loading is expected. For example, while the embodiment shown in FIGS. 5A through 5D is configured to handle axial, tangential, and radial loadings, the coupling apparatus 404 shown in FIG. 7 may be configured to withstand substantial axial loadings (such as loadings applied generally in the direction between the shear block 420 and the load acceptance members 424 and 426) and wherein expected tangential- or torsional-type loadings are below a specified threshold.

It is additionally noted that combinations of features of the numerous above-described embodiments may be utilized. For example, multiple types of structural members (i.e., 230, 232, 330, 332, 430 and 432) may be utilized in a coupling apparatus with one structural member being configured for substantial single axis loading and another structural member being configured for multiple axis loading.

Figure 8:
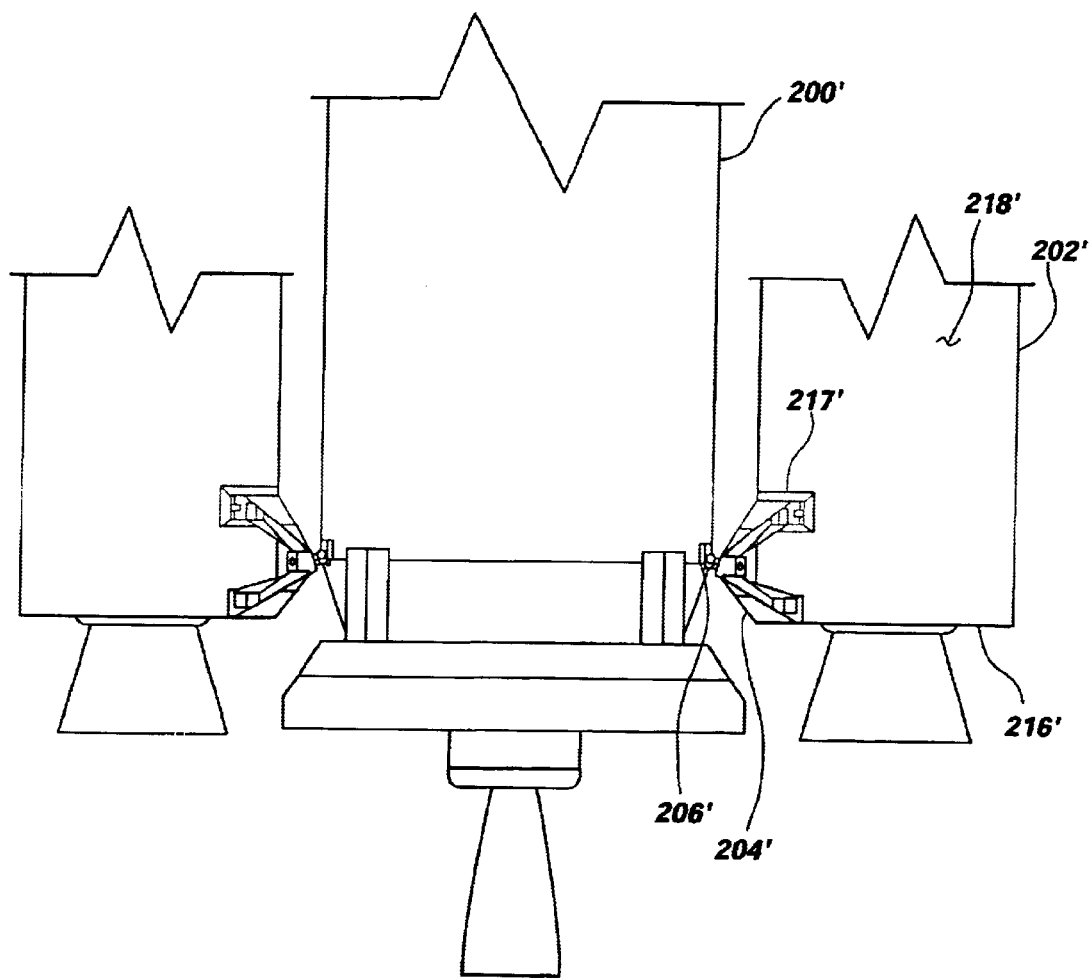
FIG. 8 is a partial elevational view of a core rocket vehicle and associated booster rocket motors attached according to another aspect of the present invention.
Figure 9A:
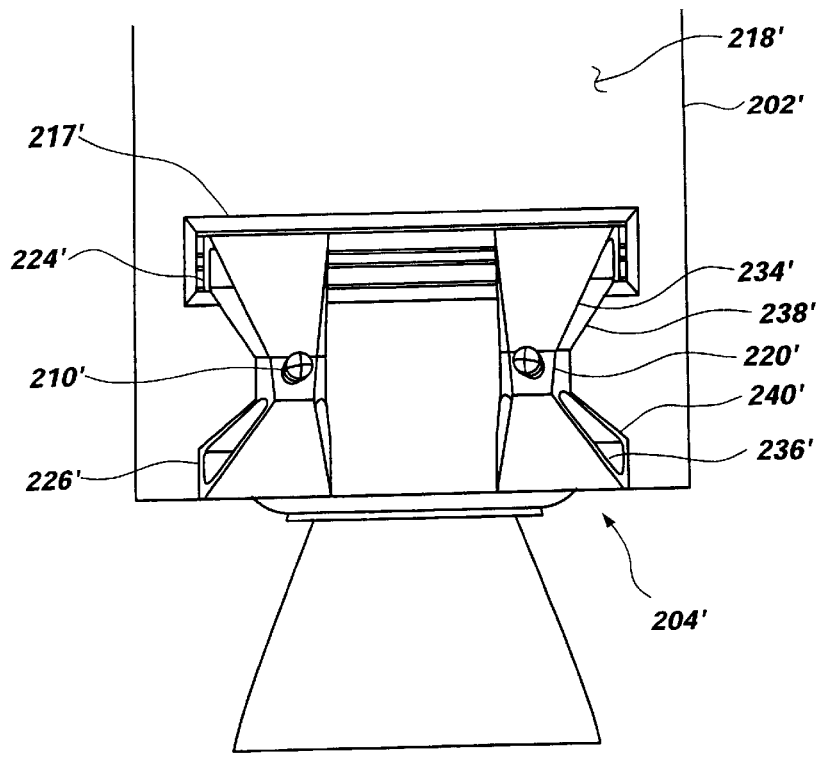
FIGS. 9A and 9B show partial elevational views and plan views respectively of the booster rocket motor and coupling apparatus of FIG. 8.
Figure 9B:
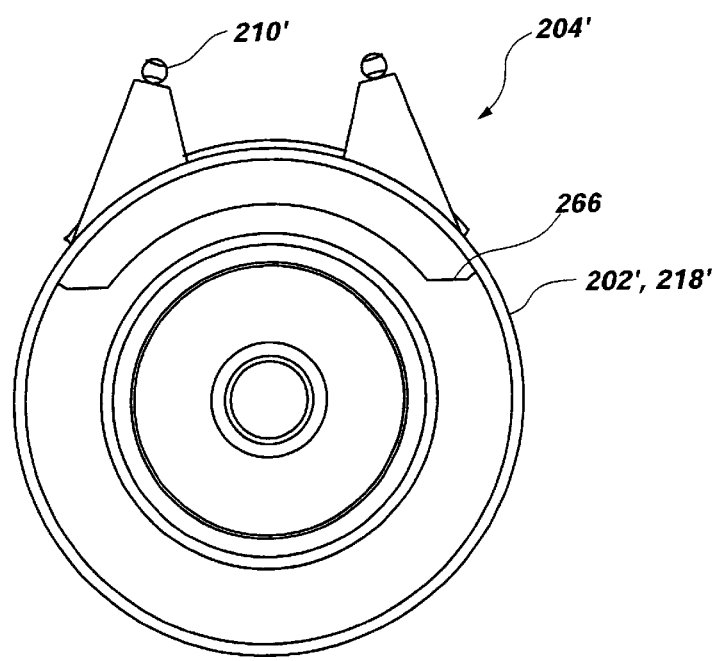

Referring now to FIGS. 8, 9A and 9B, an alternative embodiment of the invention is shown wherein multiple coupling apparatuses 204' are utilized in coupling the core rocket vehicle 200' with the booster rocket motor 202'. According to this embodiment, there are two attachment blocks 206' on the core rocket vehicle 200' for each booster rocket motor 202' which is to be attached. Such an arrangement allows for the distribution of thrust load through two-point loads on the core rocket vehicle 200' rather than just one accommodating the transfer of a greater amount of thrust to be transferred to the core rocket vehicle 200'. Additionally, the use of two coupling apparatuses 204' allows the placement of the thrust load on the booster rocket motor 202' to be distributed even further around the booster rocket motor casing 218' circumferentially as shall be discussed in more detail below.

The coupling apparatuses 204' are essentially of the same construction as described above with respect to FIGS. 5A through 5E, except that the load acceptance members 224' and 226' may not be as wide. Additionally, the widths of the flange members 234', 236', 238' and 240' are more asymmetrical. Particularly, the interior edges of the flange members 234', 236', 238' and 240' are shorter than their exterior edges as they extend from the shear block 220' to the load acceptance members 224' and 226'. Such a design allows for the attachment of a larger diameter booster rocket motor 202' having greater thrust capacity while still maintaining high stand-off distances of one to two feet or greater.

Figure 10A:
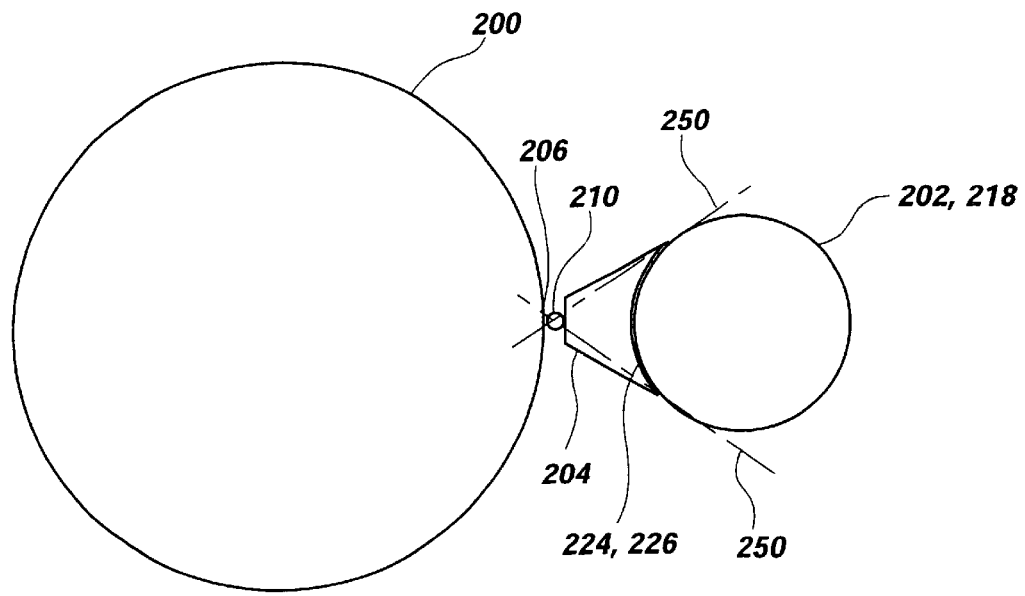
FIGS. 10A and 10B are schematics of core rocket vehicles with associated booster rocket motors showing potential sizing criteria for various aspects of the invention.
Figure 10B:
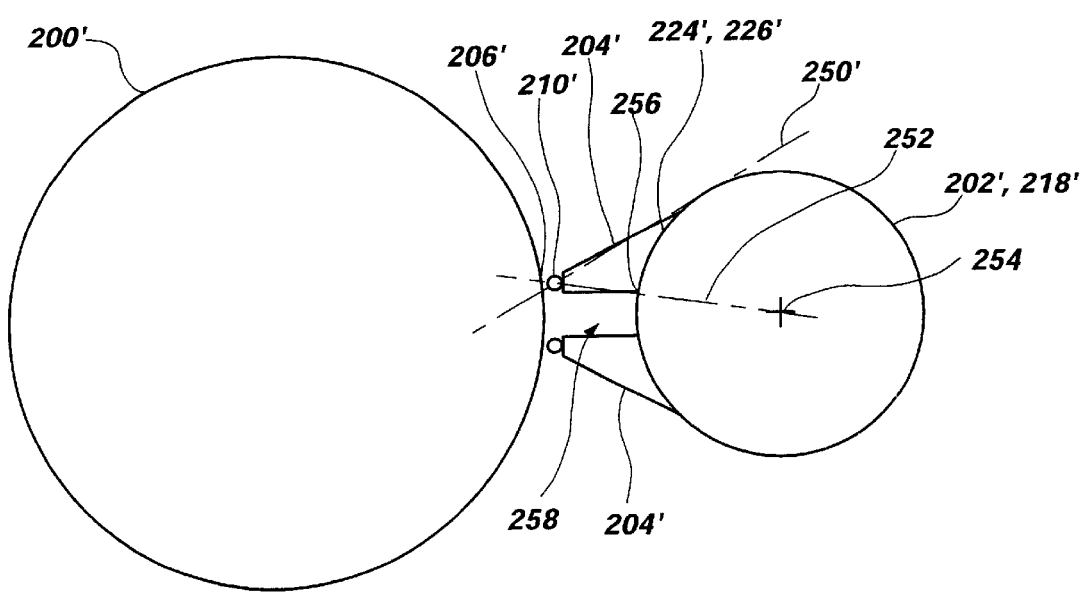

Referring to FIGS. 10A and 10B, a manner of determining the circumferential extents of the coupling apparatus 204 and 204' about the booster rocket motors 202 and 202' is shown. FIG. 10A depicts the embodiment of a coupling apparatus 204 coupling the booster rocket motor 202 with core rocket vehicle 200. In such a case, the desired circumferential extents of the load acceptance members 224 and 226 about the booster rocket motor casing 218 can be determined by extending a line from the attachment point on the core rocket vehicle 200 (i.e., through the ball joint 210) tangent to the booster rocket motor casing 218 as represented by tangent lines 250. It is noted that since there is only a single attachment point on the core rocket vehicle 200, and due to the position of the ball joint 210 therebetween, the tangent lines are symmetric relative to the booster rocket motor 202. If the load acceptance members 224 and 226 were to extend circumferentially beyond these two tangent lines, the portions beyond the tangent lines would be inefficient in transferring thrust load from the booster rocket motor 202 to the core rocket vehicle 200 and thus would likely only add unneeded material and weight to the coupling apparatus 204.

A manner of determining the circumferential extents of the load acceptance members 224' and 226' differs when multiple coupling apparatuses 204' are utilized in coupling a booster rocket motor 202' to the core rocket vehicle 200'. In this case, a first tangent line 250' which extends through each attachment point (ball joint 210') on the core rocket vehicle 200' and is tangent to the booster rocket motor casing 218' defines the outer circumferential extent of each of the load acceptance members 224' and 226'. The respective inner extents of the load acceptance members 224' and 226' are determined by extending a radial centerline 252 through each attachment location (ball joint 210') on the core rocket vehicle 200' and the center 254 of the booster rocket motor 202'. While only one tangent line 250' and one radial centerline 252 are depicted for sake of clarity, similar lines would be utilized for each of the two coupling apparatuses 204' shown in FIG. 10B.

Thus, it may be readily seen that, because of the multiple attach points on the core rocket vehicle 200' (i.e., the attachment blocks 206' and ball joints 210'), the load acceptance members 224' and 226' may be positioned to extend slightly further out circumferentially (based on the altered position of the tangent line 250') but also have an inner termination point 256 creating a gap 258 between the two coupling apparatuses 204'. Again, if the load acceptance members 224', 226', were to extend circumferentially beyond the tangent lines 250' or into the indicated gap 258, they would be inefficient in the transfer of thrust load.

It should be understood that FIGS. 10A and 10B are exemplary in that they depict how the circumferential limits of the load acceptance members may be determined. However, the load acceptance members 224, 226, 224' and 226' may be designed to stop circumferentially short of such limits and still efficiently transfer thrust load.

Figure 11:
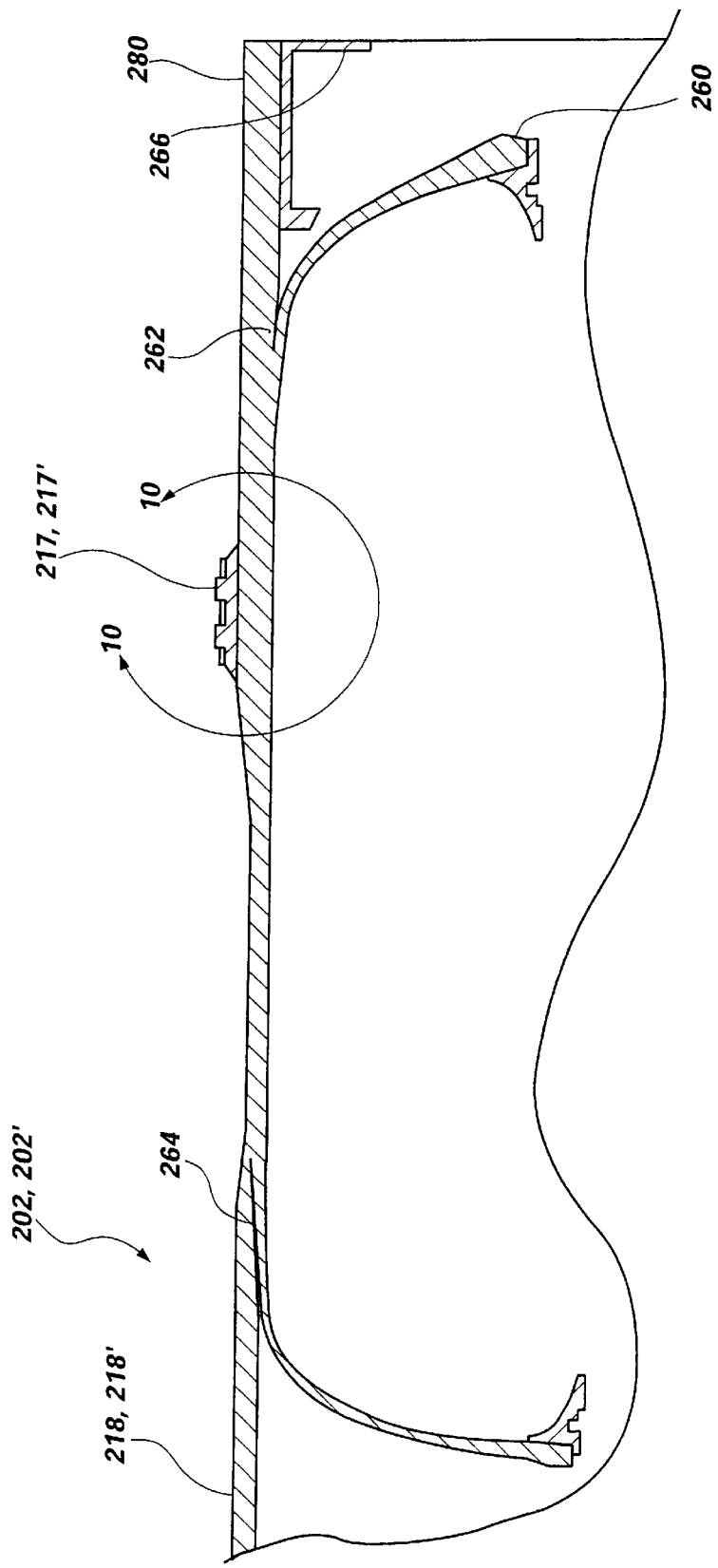
FIG. 11 shows a partial sectional view of the aft end of a booster rocket motor incorporating certain aspects of the present invention.
Figure 12:
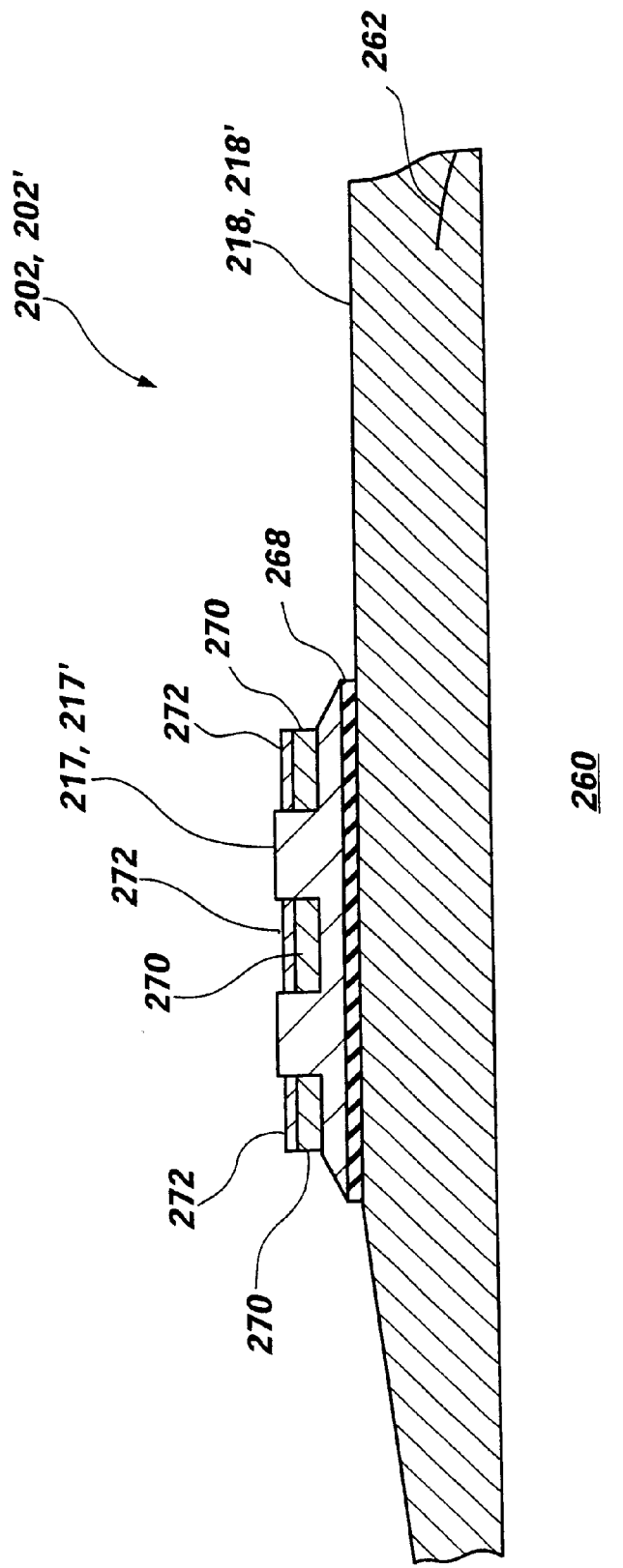
FIG. 12 is an enlarged view of the area indicated by line 12—12 in FIG. 11.

Referring now to FIGS. 11 and 12, a partial sectional view of the booster rocket motors 202, 202' is shown including the locations where the coupling apparatuses 204, 204' will be attached. While the outer skin of the booster rocket motor 202, 202' shown in FIGS. 11 and 12 will be discussed in terms of being the casing or membrane 218, 218' of the booster rocket motor, it should be understood that the following discussion similarly applies to the casing or membrane of a separate skirt which may be coupled to the booster rocket motor 202, 202' depending on its size as is understood by those of skill in the art.

FIG. 11 shows the casing or membrane 218, 218' along with a portion of an exhaust nozzle 260 which directs and modifies the flow of exhaust gases from propellant ignited within the booster rocket motors 202, 202'. The exhaust nozzle 260 may be integrated into the booster rocket motor casing 218, 218' such as is shown at locations 262 and 264. A stiffening ring 266 (see FIG. 9B) is provided at the aft end 216, 216' of the booster rocket motor 202, 202' (or the aft end of the aeroskirt as the case may be) along the interior surface of the casing 218, 218'. The stiffening ring 266 provides added structural reinforcement of the casing 218, 218' at the aft end 216, 216' to assist in distributing the thrust load as it is passed from the booster rocket motor 202, 202' and through the coupling apparatus 204, 204'. As can be seen in FIG. 9B, the stiffening ring 266 need not circumnavigate the entire interior surface of the casing 218, 218' but instead is desirably positioned to reinforce the area of the casing where the aft load acceptance member 226, 226' will be attached. The stiffening ring 266 may be formed to be internal or external to the case skirt 280 of the booster rocket motor 202, 202'.

A saddle 217, 217' is formed with each respective casing 218, 218' to allow attachment of the forward load acceptance member 224, 224' of the coupling apparatus. As shown in FIG. 12, the saddle 217, 217' may be constructed by providing a rubber shear ply 268 along the outer surface of the casings 218, 218'. The rubber shear ply 268 acts to isolate the pressure applied to the interior of the casings 218, 218' generated by the exhaust gases flowing through the nozzles 260 from the coupling apparatus 204, 204'. The rubber shear ply may be formed of natural or synthetic rubber such as, for example, nitrile-butadiene rubber (NBR) or ethylene-propylene-diene monomer (EPDM).

The saddle 217, 217' may be placed on the shear ply 268 and then attached to the casing 218, 218' by placing a graphite hoop overwrap 270, followed by a glass hoop overwrap 272, over portions of the saddle 217, 217' about which the graphite hoop overwrap 270 extends. The graphite hoop overwrap 270 structurally affixes each saddle 217, 217' to its respective casing 218, 218' while the glass hoop overwrap 272 assists in preventing unraveling of the underlying graphite hoop overwrap 270. The forward load acceptance member 224, 224' may then be respectively coupled to the saddles 217, 217' with a plurality of fasteners.

Figure 13:
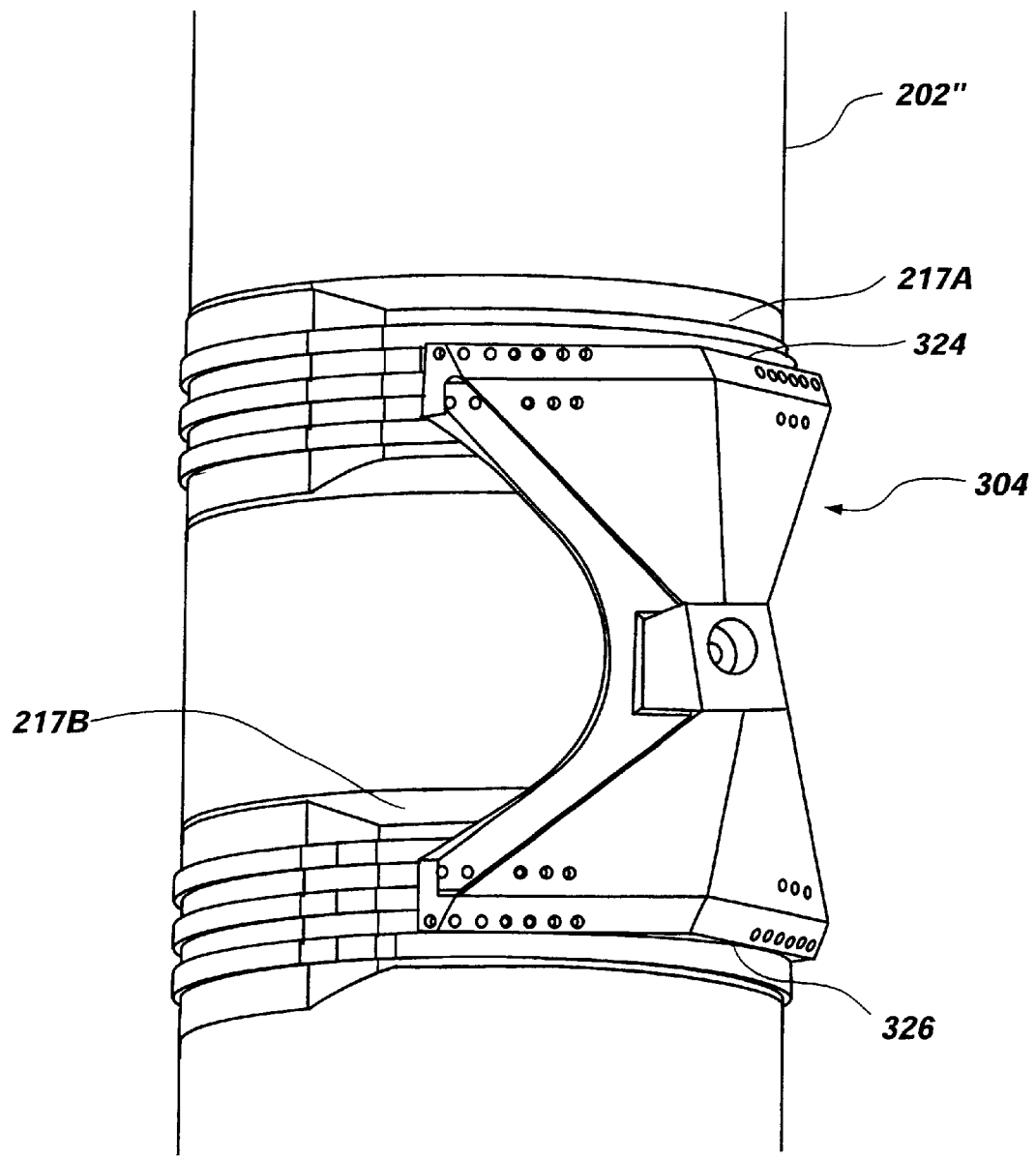
FIG. 13 is a partial elevational view of a core rocket vehicle and associated booster rocket motor attached utilizing the coupling apparatus of FIGS. 6A–6C.

Referring now to FIG. 13, a booster rocket motor 202" is shown having a coupling apparatus 304 attached thereto in accordance with another embodiment of the invention. The embodiment shown in FIG. 13 includes two saddles 217A and 217B for receipt of both load acceptance members 324 and 326 respectively. The two saddles 217A and 217B may be formed and integrated with the booster rocket motor 202" in a manner similar to that described above herein.

The arrangement shown in FIG. 13 allows for attachment of the coupling apparatus 304 to the booster rocket motor 202" at any location therealong as may be required. Thus, for example, the coupling apparatus 304 may be configured for mid-case attachment of the booster rocket motor 202" rather than aft-end attachment as shown in previously described embodiments. It is noted that while FIG. 13 depicts the coupling apparatus 304 according to the embodiment shown in and described with respect to FIGS. 6A through 6C, other embodiments of the apparatus may be utilized in a similar manner.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of coupling a booster rocket motor to a core rocket vehicle to transfer thrust therebetween, the method comprising:

providing a core rocket vehicle;

configuring a portion of the core rocket vehicle for substantial point loading attachment;

providing a booster rocket motor;

configuring at least a portion of the booster rocket motor for substantial load distrbuting attachment;

providing a coupling apparatus, the coupling apparatus including at least one load transfer structure configured for substantial point load attachment, at least one load acceptance structure configured for load distributing attachment and at least one structural member having a varied transverse cross section along a longitudinal extent thereof;

forming at least a portion of the at least one structural member as an I-beam, the I-beam including a first flange member, a second flange member and a web member disposed transversely between the first and second flange members;

coupling the at least one load acceptance structure to the at least a portion of the booster rocket motor configured for substantial load distributing attachment; and coupling the at least one load transfer structure to the portion of the core rocket vehicle configured for substantial point loading attachment.

2. The method according to claim 1, further comprising increasing a width of the first and second flange members of the I-beam of the at least one structural member as the at least one structural member extends from the core rocket vehicle toward the booster rocket motor.

3. The method according to claim 1, wherein forming at least a portion of the at least one structural member as an I-beam includes machining the at least one structural member.

4. A method of coupling a booster rocket motor to a core rocket vehicle to transfer thrust therebetween, the method comprising:

providing a core rocket vehicle;

configuring a portion of the core rocket vehicle for substantial point loading attachment;

providing a booster rocket motor;

configuring at least a portion of the booster rocket motor for substantial load distributing attachment;

providing a coupling apparatus, the coupling apparatus including at least one load transfer structure configured for substantial point load attachment, at least one load acceptance structure configured for load distributing attachment and at least one structural member having a varied transverse cross section along a longitudinal extent thereof;

coupling the at least one load acceptance structure to the at least a portion of the booster rocket motor configured for substantial load distributing attachment; and coupling the at least one load transfer structure to the portion of the core rocket vehicle configured for substantial point loading attachment.

5. The method according to claim 4, wherein configuring at least a portion of the booster rocket motor for substantial load distributing attachment includes forming at least one saddle in the at least a portion of the booster rocket motor.

6. The method according to claim 4, further comprising forming the at least one structural member of a material comprising aluminum.

7. The method according to claim 4, wherein configuring at least a portion of the booster rocket motor for substantial load distributing attachment includes providing a stiffening ring at an aft end of the booster rocket motor taken in a direction of intended motion of the booster rocket motor.

8. The method according to claim 4, further comprising arranging the at least one structural member to allow at least approximately eight inches of lateral stand-off distance between the core rocket vehicle and the booster rocket motor.

9. The method according to claim 4, further comprising arranging the at least one structural member to allow at least thirty-six inches of lateral stand-off distance between the core rocket vehicle and the booster rocket motor.

10. The method according to claim 4, further comprising configuring the at least one structural member for multi-axis loading.

11. The method according to claim 4, further comprising configuring the at least one structural member for substantially single axis loading.

12. An apparatus for coupling a booster rocket motor to a core rocket vehicle comprising:

at least one load acceptance structure configured for load distributing attachment to the booster rocket motor;

at least one load transfer structure configured for substantial point load attachment to the core rocket vehicle; and at least one structural member coupled between the at least one load acceptance structure and the at least one load transfer structure wherein the at least one structural member includes at least a portion configured as an I-beam.

13. The apparatus of claim 12, wherein the at least a portion of the at least one structural member configured as an I-beam includes a first flange member, a second flange member and a web member disposed transversely between the first and second flange members and wherein at least one of the first flange member, second flange member, and web member exhibits a varied transverse cross section along a longitudinal extent of the I-beam.

14. The apparatus of claim 13, wherein each of the first flange member, second flange member, and web member exhibits a varied cross section along the longitudinal extent of the I-beam.

15. The apparatus of claim 13, wherein the first and second flange members exhibit a first width adjacent the at least one load acceptance structure and a second, lesser width adjacent the at least one load transfer structure.

16. The apparatus of claim 13, wherein a height of the web member varies as it extends between the at least one load acceptance structure and the at least one load transfer structure.

17. The apparatus of claim 14, wherein the web member includes a tapered, varied thickness between the first flange member and the second flange member.

18. The apparatus of claim 12, wherein the at least one load transfer structure includes a shear block coupled with the at least one structural member.

19. The apparatus of claim 18, wherein the shear block is configured to be attached to the core rocket vehicle with one of a ball joint coupling, half ball joint coupling, and a pin and clevis coupling.

20. The apparatus of claim 12, wherein the at least one load acceptance structure is configured to be attached to a saddle formed on the booster rocket motor.

21. The apparatus of claim 12, wherein the at least one load acceptance structure is configured to be bolted to a portion of the booster rocket motor.

22. The apparatus of claim 12, wherein the at least one structural member, the at least one load acceptance structure and the at least one load transfer structure are formed as a unitary member.

23. The apparatus of claim 12, wherein the at least one structural member, the at least one load acceptance structure and the at least one load transfer structure are fabricated as mutually independent members.

24. The apparatus of claim 23, wherein the at least one load transfer structure and the at least one load acceptance structure are each welded to the at least one structural member.

25. The apparatus of claim 23, wherein the at least one load transfer structure and the at least one load acceptance structure are each mechanically fastened to the at least one structural member.

26. The apparatus of claim 12, wherein the at least one structural member, the at least one load acceptance structure and the at least one load transfer structure are formed of a material comprising aluminum.

27. The apparatus of claim 12, wherein the booster rocket motor is formed of a first material and the at least one structural member, the at least one load acceptance structure and the at least one load transfer structure are formed of a second material, wherein the first material and the second material exhibit a substantially similar modulus of elasticity.

28. The apparatus of claim 12, wherein the at least one load acceptance structure and the at least one load transfer structure are spaced by the at least one structural member so as to maintain a lateral distance of at least approximately 8 inches between the booster rocket motor and the core rocket vehicle.

29. The apparatus of claim 28, wherein the at least one load acceptance structure and the at least one load transfer structure are spaced by the at least one structural member so as to maintain a lateral distance of approximately 36 inches between the booster rocket motor and the core rocket vehicle.

30. An apparatus for coupling a booster rocket motor to a core rocket vehicle comprising:
   a load transfer structure configured for substantial point load attachment to the core rocket vehicle;
   a first load acceptance structure and a second load acceptance structure, each being configured for substantial load distributing attachment to the booster rocket motor;
   a first structural member configured as an I-beam coupled between the load transfer structure and the first load acceptance structure;
   a second structural member configured as an I-beam coupled between the load transfer structure and the second load acceptance structure.

31. The apparatus of claim 30, wherein the first load acceptance structure is positioned in a direction of intended motion of the core rocket vehicle forward of the load transfer structure and the second load acceptance structure is positioned aft of the load transfer structure.

32. The apparatus of claim 31, wherein the load transfer structure, the first and second load acceptance structures and the first and second structural members are all formed as a unitary member.

33. The apparatus of claim 32, wherein the unitary member is formed of a material comprising aluminum.

34. The apparatus of claim 33, wherein the first and second structural members each include a first flange member, a second flange member and a web member transversely disposed therebetween, and wherein at least one of the first and second flange members and the web member of the first and second structural members exhibits a varied transverse cross section along a longitudinal extent thereof.

35. The apparatus of claim 34, wherein the first and second flange members of the first and second structural members exhibit an increasing width as they extend away from the load transfer structure.

36. The apparatus of claim 35, wherein the web members of the first and second structural members exhibit a tapered thickness between the first and second flange members.

37. An apparatus for attaching a booster rocket motor to a core rocket vehicle comprising:
   at least one load transfer structure configured for substantial point load attachment to the core rocket vehicle;
   at least one load acceptance structure configured for substantial load distributing attachment to the booster rocket motor; and
   at least one structural member coupled between the at least one load transfer structure and the at least one load acceptance structure, the at least one structural member exhibiting a varied transverse cross section as it extends longitudinally from the at least one load transfer structure toward the at least one load acceptance structure, and wherein the at least one structural member includes at least a portion configured as at least one of an I-beam and a C-shaped member.

38. An apparatus for attaching a booster rocket motor to a core rocket vehicle comprising:
   at least one load transfer structure configured for substantial point load attachment to the core rocket vehicle;
   a first load acceptance member configured for substantial load distributing attachment to the booster rocket motor;
   a second load acceptance member configured for substantial load distributing attachment to the booster rocket motor;
   a first structural member coupled between the at least one load transfer structure and the first load acceptance structure, the first structural member including a first flange member coupled with a first web member;
   a second structural member coupled between the at least one load transfer structure and the second load acceptance structure, the second structural member including a second flange member coupled with a second web member; and
   a common flange member coupled between the first load acceptance structure and the second load acceptance structure, the common flange member also being coupled with the first and second web members and the at least one load transfer structure.

39. The method according to claim 5, wherein forming at least one saddle in the at least a portion of the booster rocket motor further comprises:
   configuring an attachment structure for coupling with the load acceptance structure of the coupling apparatus;
   placing a rubber shear ply adjacent an exterior surface of a composite casing of the booster rocket motor;
   placing the attachment structure over the rubber shear ply; and
   forming at least one fiber hoop overwrap on at least a portion of the attachment structure.

40. The method according to claim 39, wherein forming at least one fiber hoop overwrap includes forming at least one graphite hoop overwrap.

41. The method according to claim 39, wherein forming at least one fiber hoop overwrap includes forming at least one glass hoop overwrap.

42. The method according to claim 39, further comprising forming the rubber shear ply from nitrile-butadiene rubber.

43. The method according to claim 39, further comprising forming the rubber shear ply from ethylene-propylene-diene monomer.

* * * * *

UNITED STATES PATENT AND TRADEMARK OFFICE
CERTIFICATE OF CORRECTION

| | | |
|---|---|---|
| PATENT NO. | : 6,761,335 B2 | Page 1 of 2 |
| APPLICATION NO. | : 09/997642 | |
| DATED | : July 13, 2004 | |
| INVENTOR(S) | : Jerry B. Goodro and Thomas W. Higgs | |

It is certified that error appears in the above-identified patent and that said Letters Patent is hereby corrected as shown below:

In the drawings:
    In FIG. 11,      change both occurrences of reference numeral "10" to --12--

Please replace FIG. 11 with the following amended figure:

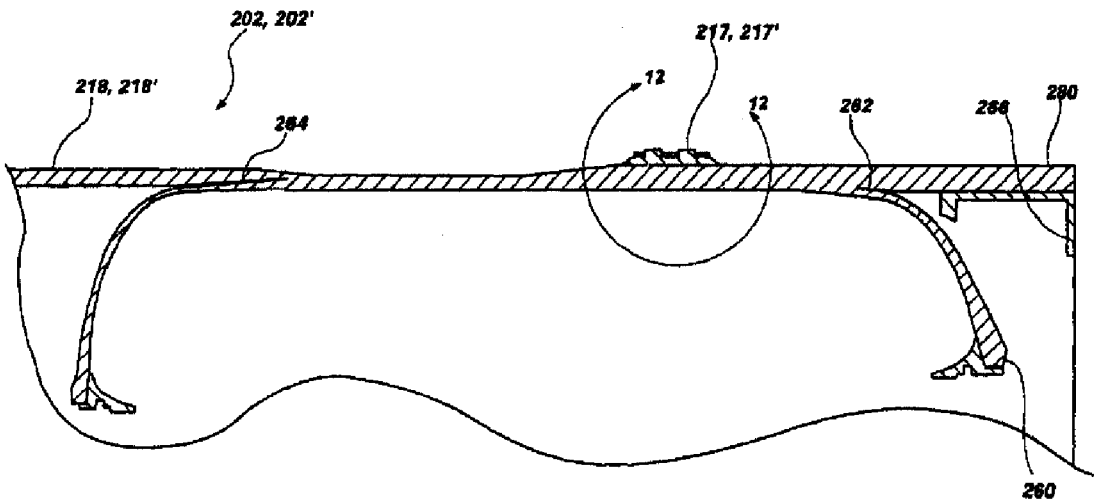

Fig. 11

UNITED STATES PATENT AND TRADEMARK OFFICE
CERTIFICATE OF CORRECTION

PATENT NO. : 6,761,335 B2
APPLICATION NO. : 09/997642
DATED : July 13, 2004
INVENTOR(S) : Jerry B. Goodro and Thomas W. Higgs It is certified that error appears in the above-identified patent and that said Letters Patent is hereby corrected as shown below:

| | | |
|---|---|---|
| COLUMN 2, | LINE 18, | after "rocket motors" insert --108-- |
| COLUMN 2, | LINE 22, | after "core rocket vehicle" insert --100-- |
| COLUMN 11, | LINE 60, | after "casing" insert --218, 218'-- |
| COLUMN 12, | LINE 8, | after "ply" insert --268-- |

Signed and Sealed this

Thirty-first Day of March, 2009

JOHN DOLL
*Acting Director of the United States Patent and Trademark Office*